United States Patent
Chu et al.

(10) Patent No.: US 8,797,127 B2
(45) Date of Patent: Aug. 5, 2014

(54) MEMS SWITCH WITH REDUCED DIELECTRIC CHARGING EFFECT

(75) Inventors: Chia-Hua Chu, Zhubei (TW); Chung-Hsien Lin, Hsinchu (TW); Chun-Wen Cheng, Zhubei (TW)

(73) Assignee: Taiwan Semiconductor Manufacturing Company, Ltd., Hsin-Chu (TW)

( * ) Notice: Subject to any disclaimer, the term of this patent is extended or adjusted under 35 U.S.C. 154(b) by 303 days.

(21) Appl. No.: 12/951,492

(22) Filed: Nov. 22, 2010

(65) Prior Publication Data

US 2012/0125747 A1 May 24, 2012

(51) Int. Cl.
*H01H 51/22* (2006.01)
(52) U.S. Cl.
USPC .............................................. 335/78; 200/181
(58) Field of Classification Search
USPC .............................................. 335/78; 200/181
See application file for complete search history.

(56) References Cited

U.S. PATENT DOCUMENTS

| | | | |
|---|---|---|---|
| 6,384,353 B1 * | 5/2002 | Huang et al. | 200/181 |
| 6,657,525 B1 * | 12/2003 | Dickens et al. | 335/78 |
| 6,777,765 B2 | 8/2004 | Chen et al. | |
| 7,609,136 B2 * | 10/2009 | Wang et al. | 335/78 |
| 2006/0012940 A1 | 1/2006 | Song et al. | |
| 2006/0091983 A1 * | 5/2006 | Robert | 335/78 |
| 2009/0272635 A1 * | 11/2009 | Suzuki | 200/181 |
| 2010/0001355 A1 | 1/2010 | Peczalski et al. | |
| 2010/0171575 A1 | 7/2010 | Min et al. | |
| 2010/0181173 A1 | 7/2010 | Rodriguez et al. | |

* cited by examiner

*Primary Examiner* — Bernard Rojas
(74) *Attorney, Agent, or Firm* — Haynes and Boone, LLP

(57) ABSTRACT

The present disclosure provides in one embodiment, a semiconductor device that includes a MEMS switch having a substrate, a first dielectric layer disposed above the substrate, and a bottom signal electrode, a bump, and a bottom actuation electrode disposed above the first dielectric layer. The MEMS switch further includes a second dielectric layer enclosing the bottom signal electrode, and a movable member including a top signal electrode disposed above the bottom signal electrode and a top actuation electrode disposed above the bottom actuation electrode and the bump, wherein the top actuation electrode is electrically coupled to the bump. A method of fabricating a MEMS switch is also disclosed.

20 Claims, 5 Drawing Sheets

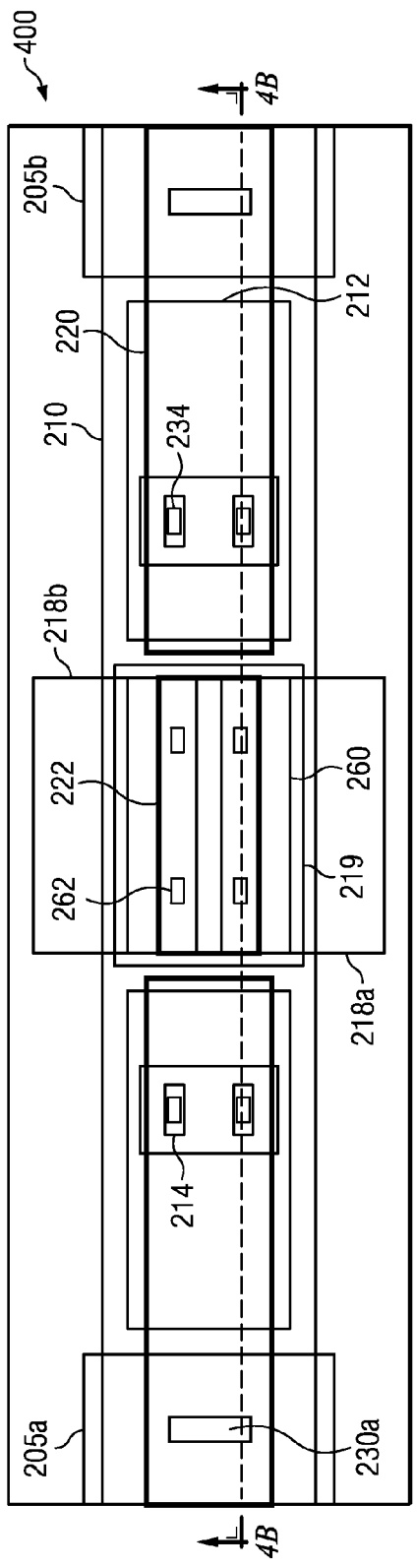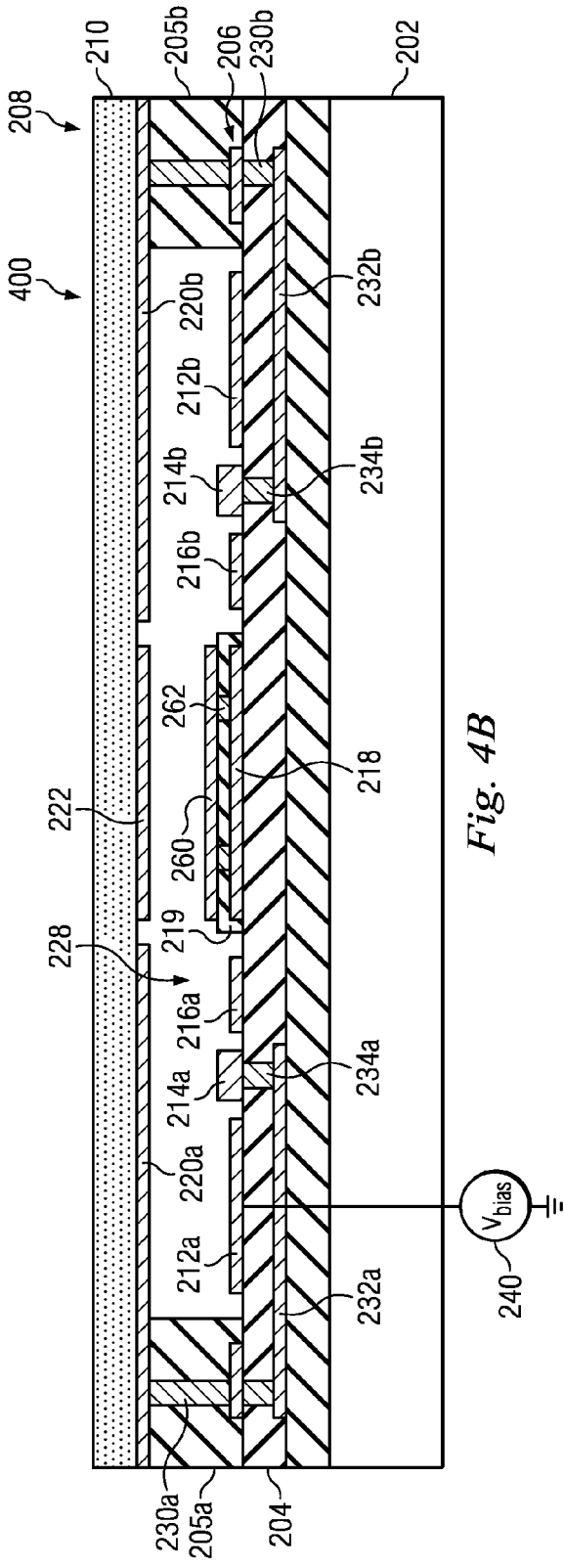

MEMS SWITCH WITH REDUCED DIELECTRIC CHARGING EFFECT

BACKGROUND

A variety of micro-electro-mechanical systems (MEMS) switches are in use in radar and communication systems as well as other high frequency circuits for controlling RF signals. Many of these MEMS switches generally have electrostatic elements, such as opposed electrodes, which are attracted to one another upon application of an actuation voltage (e.g., from a DC voltage source), resulting in the establishment of a high capacitive coupling and/or reduced electrical impedance between spaced apart signal electrodes. Thus, a signal is allowed to propagate between the spaced apart signal electrodes.

In the capacitive-type MEMS switch, a dielectric layer is deposited on top of a first signal electrode and underneath a second moveable signal electrode. With this arrangement, the full actuation voltage may appear across the dielectric layer resulting in a high electric field across the dielectric layer. This high field can lead to charge accumulation on the dielectric surface as well as in the bulk dielectric (also known as the dielectric charging effect), which can lead to switch failure and/or reliability issues from stiction and/or degradation of capacitance values. Contact-type MEMS switches have utilized dielectric layers between the top and bottom actuation electrodes to prevent electrical shorting of the actuation electrodes, and these dielectric layers between the top and bottom actuation electrodes may encounter similar problems from the dielectric charging effect, which can lead to device reliability issues and/or performance degradation.

Prior designs have utilized dielectric or metal bumps on the actuation electrode in an attempt to prevent stiction, but the dielectric bump has trapped charge, and the metal bump has caused issues with the floating voltage potential. Accordingly, improved MEMS switches and methods of fabricating such MEMS switches are desired.

BRIEF DESCRIPTION OF THE DRAWINGS

Aspects of the present disclosure are best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 4A and 4B are a top view and a cross-sectional view, respectively, of a MEMS switch in accordance with another embodiment of the present disclosure.

DETAILED DESCRIPTION

Figure 1:
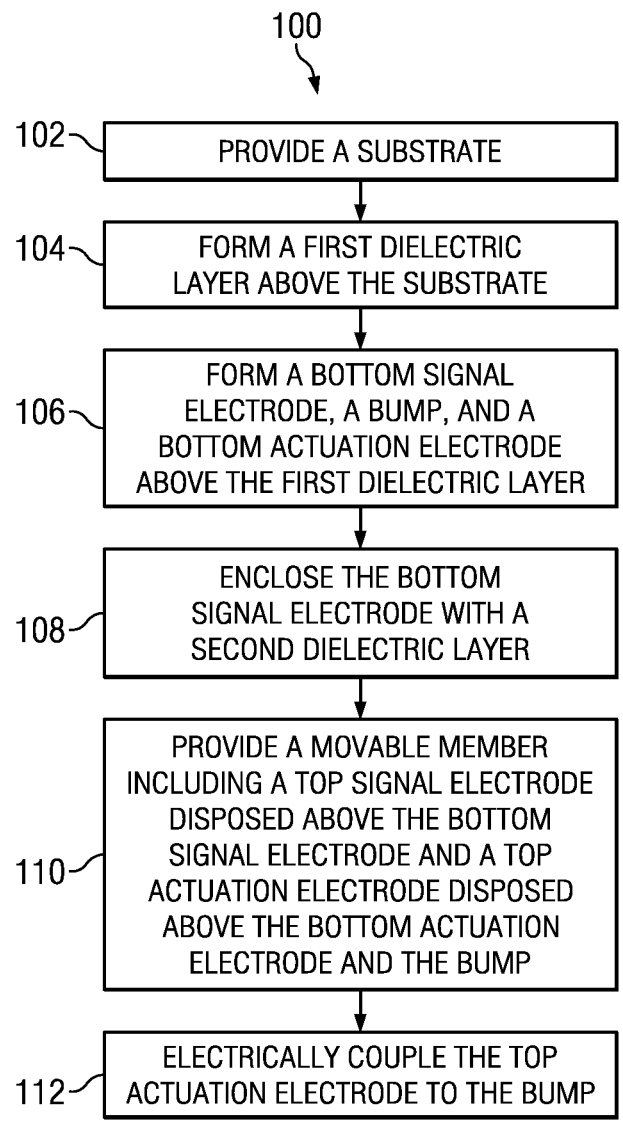
FIG. 1 is a flowchart of a method of fabricating a micro-electro-mechanical systems (MEMS) switch in accordance with an embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

It is understood that several processing steps and/or features of a device may be only briefly described, such steps and/or features being well known to those of ordinary skill in the art. Also, additional processing steps or features can be added, and certain of the following processing steps or features can be removed and/or changed while still implementing the claims. Thus, the following description should be understood to represent examples only, and are not intended to suggest that one or more steps or features is required. Furthermore, as described above, specific embodiments may be described herein which are exemplary only and not intended to be limiting.

FIG. 1 is a flowchart illustrating a method 100 for fabricating a MEMS switch in accordance with an embodiment of the present disclosure. The method 100 begins at block 102 where a substrate is provided. At block 104, a first dielectric layer is formed above the substrate. At block 106, a bottom signal electrode, a bump, and a bottom actuation electrode are formed above the first dielectric layer. At block 108, the bottom signal electrode is enclosed with a second dielectric layer. For a contact switch, an additional bottom contact electrode is deposited and patterned over the second dielectric layer. At block 110, a movable bridge member is provided. In one embodiment, the movable member may be supported by at least one support member of the first dielectric layer. The support member can include the first dielectric layer or a combination of the first dielectric layer and other layers. According to an aspect, the movable member includes a top signal electrode disposed above the bottom signal electrode and a top actuation electrode disposed above the bottom actuation electrode and the bump. At block 112, the top actuation electrode is electrically coupled to the bump, and in one embodiment is electrically coupled to the bump by at least one via and at least one line through the first dielectric layer. Thus, the bump will have substantially the same voltage potential as the top actuation electrode for reducing dielectric charging across intervening dielectric layers.

During operation, the top actuation electrode of the movable bridge member is drawn toward the bottom actuation electrode upon application of a voltage (e.g., a DC voltage) to the bottom actuation electrode, thereby also drawing the top signal electrode of the movable member toward the bottom signal electrode until contact is made with the second dielectric layer. In other words, a voltage difference is applied between top and bottom actuation electrodes to induce an electrostatic force to move the movable member.

For the case of a capacitive-type switch, with the top signal electrode contacting the second dielectric layer, the switch capacitance is significantly increased while the switch impedance is significantly lowered, allowing a signal to propagate between the top and bottom signal electrodes, and thus turning "on" the switch.

Accordingly, method 100 provides for advantageously reducing the dielectric charging effect in a MEMS switch by not including a dielectric layer on the bottom actuation electrode, thereby removing a source of dielectric charging. Furthermore, a bump having a larger thickness than the bottom actuation electrode is provided to prevent an electrical short circuit between the top and bottom actuation electrodes, and the bump is also electrically coupled to the top actuation electrode (on the movable member) to substantially prevent a voltage difference between the bump and top actuation electrode, thereby further reducing the dielectric charging effect induced by a voltage difference.

In addition, the actuation electrodes are electrically separate from the signal electrodes (e.g., the bottom actuation electrode and the bottom signal electrode are discrete electrodes set apart from one another, and the top actuation and signal electrodes are also discrete electrodes apart from one another), thereby avoiding a charging effect in capacitive-type switches and a short circuit issue in contact-type switches. Thus, the present disclosure substantially removes any DC voltage from the second dielectric layer used in the MEMS switch, which eliminates the dielectric charging across the dielectric layer.

Figure 2A:
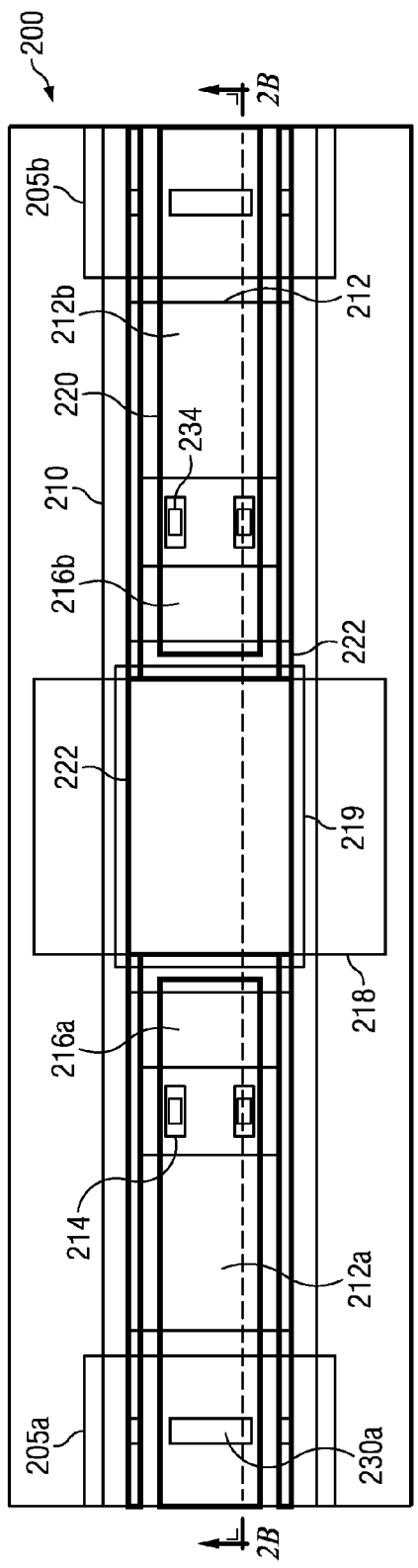
FIGS. 2A and 2B are a top view and a cross-sectional view, respectively, of a MEMS switch in accordance with an embodiment of the present disclosure.
Figure 2B:
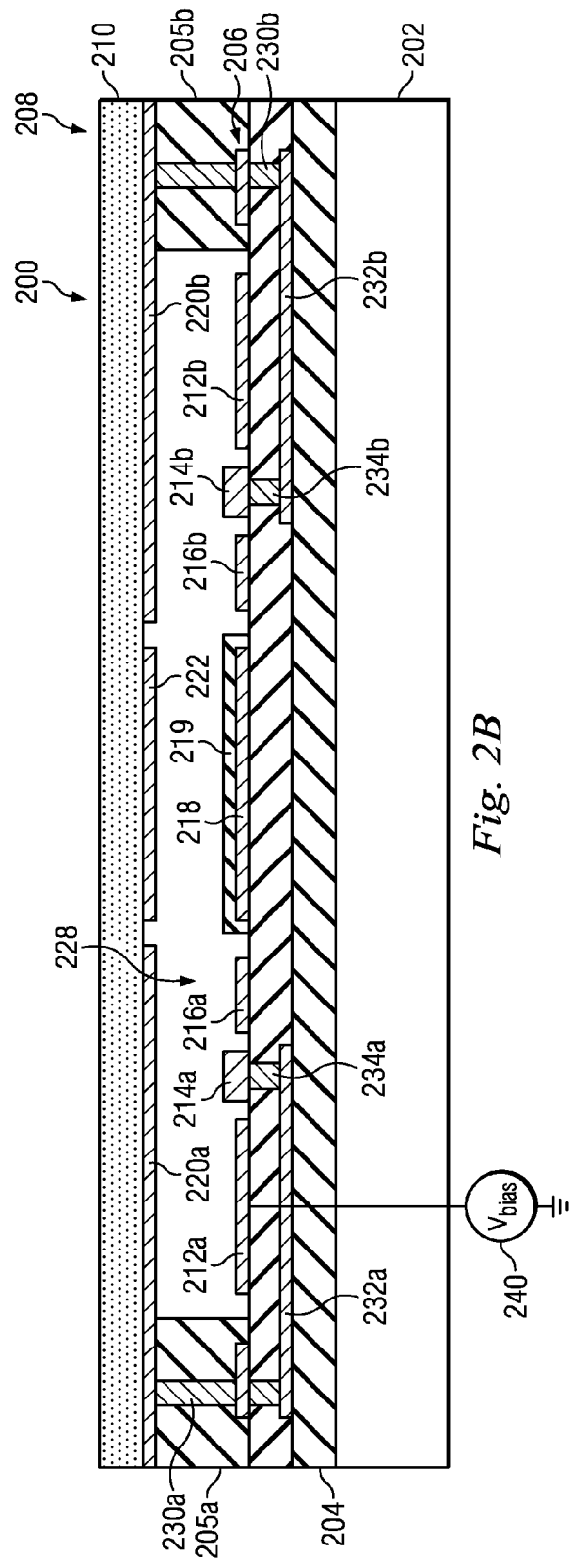

Referring now to FIGS. 2A and 2B, FIG. 2A is a top view and FIG. 2B is a cross-sectional view along line 2B-2B of a capacitive-type MEMS switch 200 at various stages of fabrication in accordance with embodiments of the present disclosure. MEMS switch 200 includes a substrate 202, a first dielectric layer 204 disposed above the substrate 202, and a bottom metal layer 206 including a bottom signal electrode 218, a bump 214a, and a bottom actuation electrode 212a, 216a disposed above the first dielectric layer 204. The MEMS switch 200 further includes a second dielectric layer 219 enclosing the bottom signal electrode 218, and a movable bridge member 208 including a top signal electrode 222 disposed above the bottom signal electrode 218 and a top actuation electrode 220a disposed above the bottom actuation electrode 212a and the bump 214a. In one aspect, first dielectric layer 204 includes at least one support member 205a for supporting the movable bridge member 208 while providing a cavity 228 between the movable bridge member 208 and the second dielectric layer 219 and the metal layer 206. In one embodiment, the support member 205a can include the first dielectric layer 204 or a combination of the first dielectric layer 204 and other layers (e.g., second dielectric layer 219, bottom metal layer 206, and the like). In one example, cavity 228 may be filled with air or another gas, and may be a vacuum. The movable bridge member 208 further includes a structure layer 210 for allowing movement of the top actuation electrode 220a and the top signal electrode 222.

Upon application of a voltage from a source 240 to the bottom actuation electrode 212a, the top actuation electrode 220a is drawn by electrostatic attraction (i.e., a voltage difference between top and bottom actuation electrodes generates an electrostatic force) toward the bottom actuation electrode 212a. Simultaneously, top signal electrode 222 moves toward the bottom signal electrode 218 until top signal electrode 222 contacts the top surface of second dielectric layer 219. The switch capacitance is significantly increased and the switch impedance is significantly lowered, allowing a signal to propagate between the top and bottom signal electrodes 222 and 218. In accordance with the present disclosure, the top actuation electrode 220a is electrically coupled to the bump 214a by vias 230a, 234a and a line 232a. Advantageously, the electrical connection between the bump and the top actuation electrode prevents the break down of the bump and top actuation electrode when they contact each other. If the voltage potentials were different on the bump and the top actuation electrode, there would be the break down when they contact each other. The substantial elimination of the dielectric charging in the dielectric layer 219 is fulfilled by separating the actuation and signal electrodes, which allow an AC signal and no DC bias from being transmitted in the signal electrodes.

In other words, when different actuation voltages are applied to the top (e.g., electrode 220a and/or 220b) and bottom (e.g., electrode 212a and/or 212b) actuation electrodes, the voltage difference between actuation electrodes will induce a electrostatic force, which makes the switch structure 208 bend down and contact the top signal electrode 222 to the dielectric layer 219 above the bottom signal electrode 218. This causes a large capacitive coupling between top signal electrode 222 and bottom signal electrode 218. The RF signal will transmit from bottom signal electrode 218 to top signal electrode 222. For many cases, top signal electrode 222 will be connected to ground and make the RF signal not able to go through bottom signal electrode 218. When the voltage difference is removed from the actuation electrodes, the switch structure 208 will move back to its original position and cause a poor capacitive coupling between top signal electrode 222 and bottom signal electrode 218. Accordingly, the RF signal will not transmit to top signal electrode 222 and will only go through bottom signal electrode 218.

Disadvantageously, the actuation and signal electrodes are not separated in conventional MEMS capacitive switches, thereby causing the actuation voltage (bias voltage, typically DC) and RF signal (AC signal) to go through the same electrodes. Accordingly, there is dielectric charging in the dielectric layer for the traditional capacitive switch.

In one example, substrate 202 is a silicon wafer. Alternatively or additionally, the substrate of the MEMS device may include other elementary semiconductor, such as germanium, or the substrate may include a compound semiconductor, such as silicon carbide, gallium arsenic, indium arsenide, and/or indium phosphide. In another example, the substrate 202 may include a silicon-on-insulator (SOI) wafer or other structures and may be comprised of other materials, such as glass, quartz, and/or a ceramic material.

First dielectric layer 204 may be comprised of silicon oxides, carbonates, and/or nitrides in one example, deposited by one of various applicable deposition techniques, such as chemical vapor deposition (CVD), plasma enhanced CVD (PECVD), atomic layer deposition (ALD), and the like. In one embodiment, first dielectric layer 204 may be a part of at least one support member (e.g., support members 205a, 205b) for supporting movable bridge member 208. Other numbers of support members are within the scope of the present disclosure. Patterning, etch, and/or planarization techniques and methods may be used to form first dielectric layer 204 including support member 205a. The support member can also be part of the first dielectric layer or the combination of the first dielectric layer and other layers as previously noted.

Bottom signal electrode 218 and bottom actuation electrode 212a, 216a may be comprised of any applicable metal, such as aluminum, copper, tungsten, alloys thereof, and the like, and may be formed by electroplating, physical vapor deposition (PVD), sputtering, or other applicable methods and techniques. Bump 214a may also be comprised of any applicable metal, such as aluminum, copper, tungsten, and the like, and may also be formed by PVD, plating, sputtering, or other applicable methods and techniques. Patterning, etch, and/or planarization techniques and methods may be used to form the discrete and separate metal layers of the bottom signal electrode 218, the bottom actuation electrode 212a, 216a, and the bump 214a. Bump 214a is formed to have a larger thickness than the bottom actuation electrode 212a (i.e., a top surface of bump 214a is higher above dielectric 204 than a top surface of bottom actuation electrode 212a) to prevent an electrical short circuit between the top and bottom actuation electrodes. The bottom actuation electrode 212a may be connected by a thin film bias resistor to a pad to which is applied the voltage signal from source 240.

Bottom signal electrode 218 is enclosed within second dielectric layer 219, having a top dielectric layer and two dielectric sidewalls in one example. A dielectric layer may be deposited by one of various techniques, such as CVD or the like, and made relatively thin and may be selected from a class of materials chosen for hardness, hydrophobic surface, or other desired properties. The dielectric layer may then be formed into the second dielectric layer 219 by an isotropic etch through a patterned photoresist in one example, although various photolithographic patterning, etch, and/or polishing techniques are applicable and may be used.

Top signal electrode 222 and top actuation electrode 220a of movable bridge member 208 may be comprised of any applicable metal, such as aluminum, copper, tungsten, alloys thereof, and the like, and may be formed onto structure layer 210 by electroplating, physical vapor deposition, sputtering, or other applicable methods and techniques.

Structure layer 210 of movable bridge member 208 may include various architectures for allowing movement of the top actuation electrode 220a and the top signal electrode 222 upon application of a voltage from a source 240 to the bottom actuation electrode 212a, such as a cantilever architecture or a torsion architecture. In one example, structure layer 210 may include springs, movable arms, flexible membranes, and the like to allow movement of the top electrodes. In order to lend rigidity to the bridge member in the contact area, structure layer 210 may also provide support and stiffness for a central bridge portion including the top signal electrode 222 to assure good contact of the top signal electrode 222 with the second dielectric layer 219 as well as to avoid bending of the bridge which could cause short circuiting.

As noted above, in one embodiment, no dielectric layer is formed on the bottom actuation electrode 212a, thereby removing a source of dielectric charging caused by a voltage difference between opposing actuation electrodes. Furthermore, bump 214a having a larger thickness than the bottom actuation electrode 212a is provided to prevent an electrical short circuit between the top and bottom actuation electrodes 220a, 212a. The bump 214a is also electrically coupled to the top actuation electrode 220a (on the movable bridge member) to make the voltage potential substantially the same for the top actuation electrode and the bump (or as a corollary to substantially prevent a voltage difference between top actuation electrode and the bump), thereby substantially preventing a break down of the bump and top actuation electrode when they contact each other.

In addition, the actuation electrodes are electrically separate from the signal electrodes, thereby avoiding a charging effect in capacitive-type switches and a short circuit issue in contact-type switches. In this embodiment, the bottom actuation electrodes 212a, 212b and the bottom signal electrode 218 are electrically discrete electrodes set apart from one another (e.g., defined by a pattern layout), thereby making the second dielectric layer 219 sustain an AC signal without DC biasing as in conventional devices, which avoids the dielectric charging effect across the second dielectric layer.

In another embodiment, the first dielectric layer 204 includes two support members 205a, 205b. Each of the support members 205a, 205b can be part of the first dielectric layer or the combination of the first dielectric layer and other layers. Other numbers of support members for supporting the movable bridge member 208 are within the scope of the present disclosure.

The MEMS switch 200 further includes a bottom signal electrode 218 disposed between two bumps 214a, 214b, between two bottom actuation electrodes 212a, 212b, and above the first dielectric layer 204 between the two support members 205a, 205b. Movable bridge member 208 includes top signal electrode 222 disposed above the bottom signal electrode 218 and disposed between two top actuation electrodes 220a, 220b. Each of the top actuation electrodes 220a, 220b is disposed above a respective bottom actuation electrode 212a, 212b and a respective bump 214a, 214b. Each of the top actuation electrodes 220a, 220b is also electrically coupled to the respective bump 214a, 214b by at least one respective via 230a, 230b and one respective line 232a, 232b through the first dielectric layer 204 and the respective support members 205a, 205b.

Figure 3:
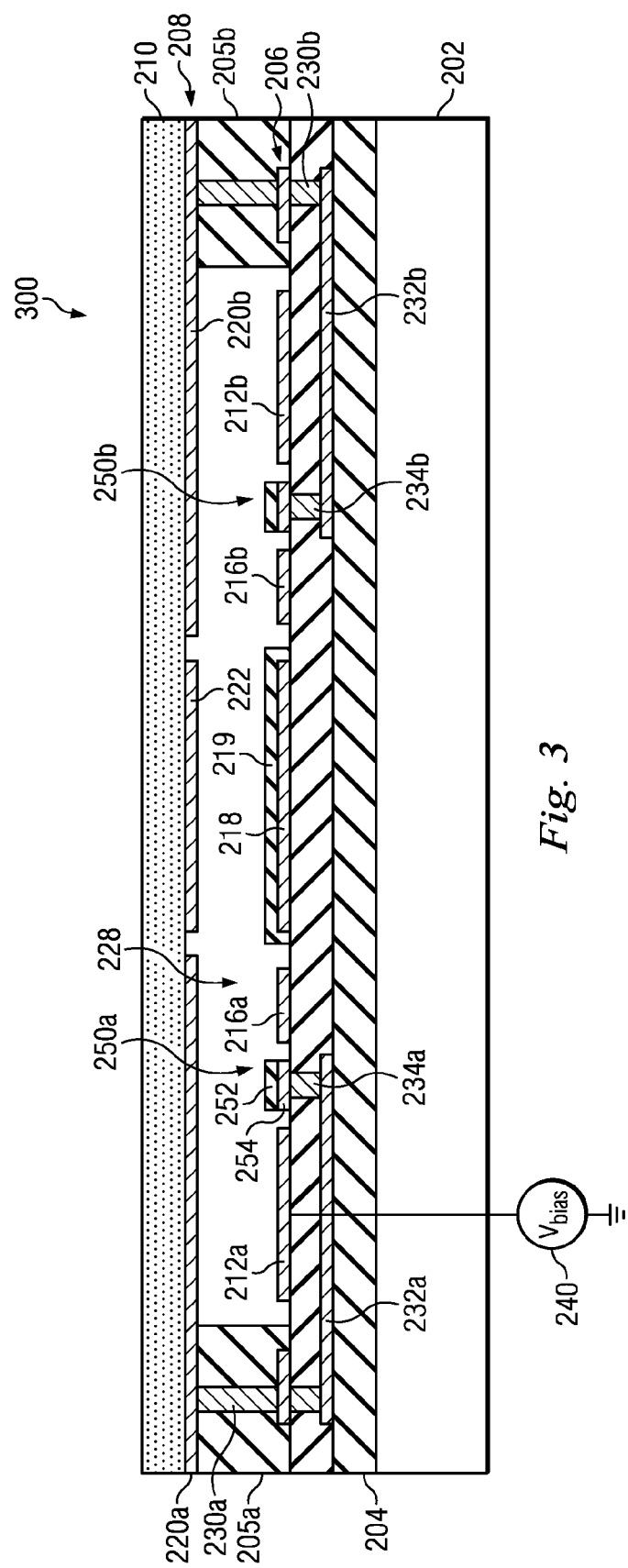
FIG. 3 is a cross-sectional view of a MEMS switch in accordance with another embodiment of the present disclosure.
Figure 5:
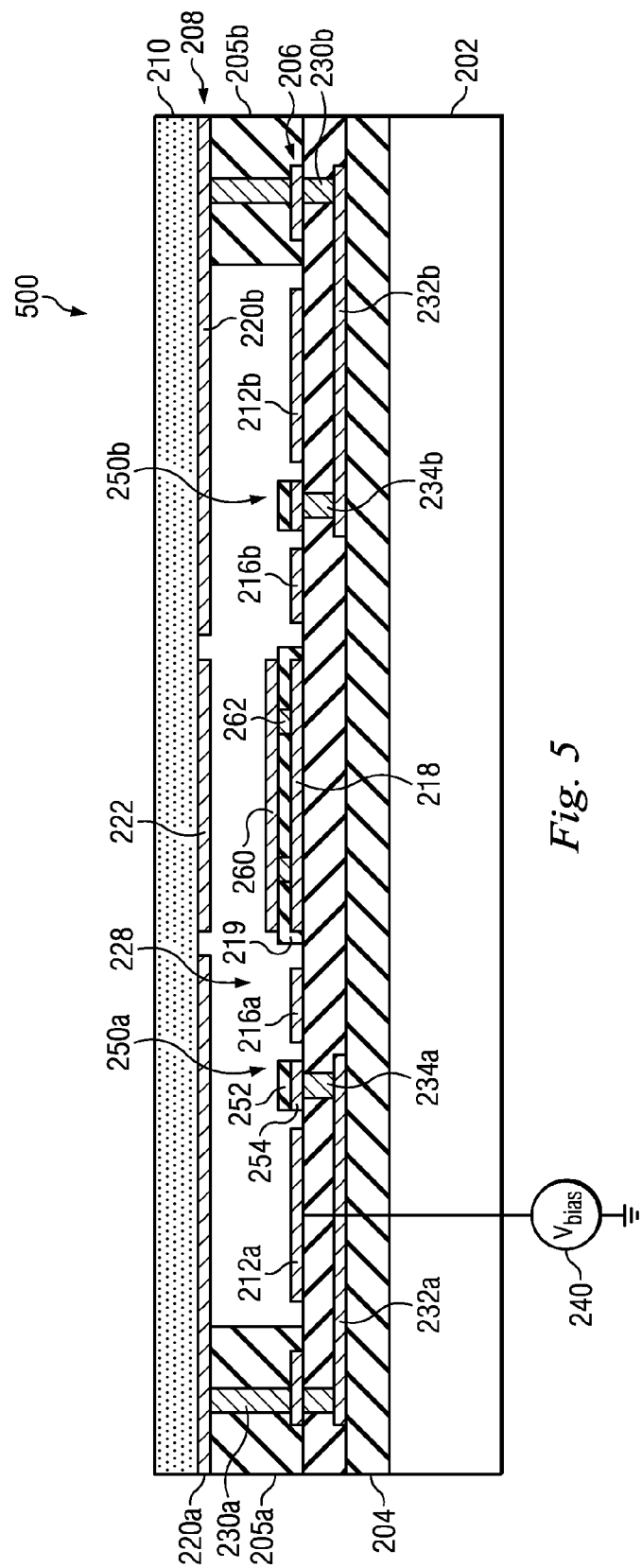
FIG. 5 is a cross-sectional view of a MEMS switch in accordance with yet another embodiment of the present disclosure.

Referring now to FIGS. 3-5, cross-sectional views are illustrated of a MEMS switch at a stage of fabrication in accordance with different embodiments of the present disclosure. Similar elements to those described above and illustrated with respect to FIGS. 2A-2B are numbered the same or similarly in FIGS. 3-5. The structures shown in FIGS. 3-5 are fabricated by substantially the same steps and processes and include substantially similar structures as illustrated in and described above with respect to FIGS. 2A-2B. As such, the steps and structures for fabrication of the structures shown in FIGS. 3-5 may not be repeated here but are fully applicable in the following embodiments.

FIG. 3 illustrates a cross-sectional view of a capacitive-type MEMS switch 300 in accordance with another embodiment of the present disclosure. MEMS switch 300 includes bumps 250a, 250b having a dielectric layer 252 disposed above a metal layer 254. Dielectric layer 252 may be comprised of various dielectric materials, such as silicon oxides, carbonates, and/or nitrides, and metal layer 254 may be comprised of various applicable metals, such as those comprising bottom actuation electrode 212a, 212b (e.g., aluminum, copper, tungsten, and the like). The total thickness of bumps 250a, 250b is greater than the thickness of bottom actuation electrode 212a. Similar to the embodiment described above, each of the bumps 250a, 250b are electrically coupled to respective top actuation electrodes 220a, 220b by at least one via 230a, 230b and one line 232a, 232b through the first dielectric layer 204.

As noted above, the electrical connection between the bump and the top actuation electrode prevents the break down of the bump and top actuation electrode when they contact each other. If the voltage potentials were different on the bump and the top actuation electrode, there would be the break down when they contact to each other.

In FIG. 3, the breakdown prevention of top actuation electrode and bump is fulfilled by introducing the dielectric layer 252. The electrical connections between top actuation electrode and bump is for the prevention of the dielectric charging in dielectric layer 252.

The substantial elimination of the dielectric charging in the dielectric layer 219 is fulfilled by separating the actuation and signal electrodes, which allow an AC signal and no DC bias from being transmitted in the signal electrodes. In the embodiment of FIG. 3, the respective electrical connections between bump 250a, 250b and top actuation electrode 220a, 220b can prevent the dielectric charging in the dielectric 252.

Referring now to FIGS. 4A and 4B, FIG. 4A illustrates a top view and FIG. 4B illustrates a cross-sectional view along line 4B-4B of a contact-type MEMS switch 400 in accordance with another embodiment of the present disclosure. MEMS switch 400 is substantially similar to MEMS switch 200 but includes a metal contact 260 disposed above the second dielectric layer 219, disposed below the top signal electrode 222, and electrically coupled to the bottom signal electrode 218 by at least one via 262. Upon application of the bias voltage on the actuation electrode 212a, top signal electrode 222 contacts metal contact 260 to switch the signal lines on. In other words, a voltage difference is induced between top and bottom actuation electrodes to move the top signal electrode 222 on the movable bridge member.

When the different actuation voltages are applied to the top (e.g., electrode 220a and/or 220b) and bottom (e.g., electrodes 212a and/or 212b) actuation electrodes, the voltage difference between actuation electrodes will induce an electrostatic force, which makes the switch structure 208 bend down and contact the top signal electrode 222 to the bottom signal electrodes (260, 218). It makes the electrical connection between the separated bottom electrodes (218a, 218b), and then the RF signal can be transmitted from bottom signal electrodes 218a to 218b. When the voltage difference is removed from the actuation electrodes, the switch structure 208 will move back to the original position and make the RF signal not be transmitted from electrodes 218a to 218b.

Disadvantageously, in the traditional MEMS contact switch, dielectric charging occurs in the dielectric layers between the top and bottom actuation electrodes.

FIG. 5 illustrates a cross-sectional view of a contact-type MEMS switch 500 in accordance with yet another embodiment of the present disclosure. MEMS switch 500 is substantially similar to MEMS switch 300 but includes a metal contact 260 disposed above the second dielectric layer 219, disposed below the top signal electrode 222, and electrically coupled to the bottom signal electrode 218 by at least one via 262.

Thus, the present disclosure provides for various embodiments of a semiconductor device. In one embodiment, a semiconductor device includes a MEMS switch including a substrate, a first dielectric layer disposed above the substrate, and a bottom signal electrode, a bump, and a bottom actuation electrode disposed above the first dielectric layer. The MEMS switch further includes a second dielectric layer enclosing the bottom signal electrode, and a movable member including a top signal electrode disposed above the bottom signal electrode and a top actuation electrode disposed above the bottom actuation electrode and the bump, wherein the top actuation electrode is electrically coupled to the bump.

In another embodiment, a MEMS switch includes a substrate, a first dielectric layer disposed above the substrate, the first dielectric layer including at least two support members, and a bottom signal electrode disposed between two bumps, between two bottom actuation electrodes, and above the first dielectric layer between the at least two support members. The MEMS switch further includes a second dielectric layer enclosing the bottom signal electrode, and a movable member including a top signal electrode disposed above the bottom signal electrode and disposed between two top actuation electrodes, wherein each of the top actuation electrodes is disposed above a respective bottom actuation electrode and a respective bump, and wherein each of the top actuation electrodes is electrically coupled to the respective bump by at least one via and one line through the first dielectric layer.

The present disclosure also provides a method of fabricating a MEMS switch. In one embodiment, the method includes providing a substrate, forming a first dielectric layer above the substrate, and forming a bottom signal electrode, a bump, and a bottom actuation electrode above the first dielectric layer. The method further includes enclosing the bottom signal electrode with a second dielectric layer, providing a movable member including a top signal electrode disposed above the bottom signal electrode and a top actuation electrode disposed above the bottom actuation electrode and the bump, and electrically coupling the top actuation electrode to the bump.

Although embodiments of the present disclosure have been described in detail, those skilled in the art should understand that they may make various changes, substitutions and alterations herein without departing from the spirit and scope of the present disclosure. Accordingly, all such changes, substitutions and alterations are intended to be included within the scope of the present disclosure as defined in the following claims. In the claims, means-plus-function clauses are intended to cover the structures described herein as performing the recited function and not only structural equivalents, but also equivalent structures.

What is claimed is:

1. A micro-electro-mechanical systems (MEMS) switch, comprising:
   a substrate;
   a first dielectric layer disposed above the substrate;
   a bottom signal electrode, a bump, and a bottom actuation electrode disposed above the first dielectric layer;
   a second dielectric layer enclosing the bottom signal electrode; and
   a movable member including a top signal electrode disposed above the bottom signal electrode and a top actuation electrode disposed above the bottom actuation electrode and the bump, wherein the top actuation electrode is electrically coupled to the bump, and
   at least one support member that comprises the first dielectric layer and is directly below the top actuation electrode.

2. The MEMS switch of claim 1, wherein the bump is disposed between the bottom signal electrode and the bottom actuation electrode.

3. The MEMS switch of claim 1, wherein the bump is comprised of a metal.

4. The MEMS switch of claim 1, wherein the bump is comprised of a dielectric layer disposed above a metal layer.

5. The MEMS switch of claim 1, wherein the top actuation electrode is electrically coupled to the bump by at least one via and one line.

6. The MEMS switch of claim 5, wherein the at least one via is formed through the at least one support member.

7. The MEMS switch of claim 1, wherein the top actuation electrode and the top signal electrode are drawn toward the bottom actuation electrode and the bottom signal electrode, respectively, upon application of a control voltage to the bottom actuation electrode, allowing a signal to propagate between the top and bottom signal electrodes.

8. The MEMS switch of claim 1, further comprising a metal contact disposed above the second dielectric layer, disposed below the top signal electrode, and electrically coupled to the bottom signal electrode.

9. The MEMS switch of claim 1, wherein the at least one support member contacts an end of the top actuation electrode.

10. A micro-electro-mechanical systems (MEMS) switch, comprising:
    a substrate;
    a first dielectric layer disposed above the substrate;

a bottom signal electrode disposed between two bumps, between two bottom actuation electrodes, and above the first dielectric layer between the at least two support members;

a second dielectric layer enclosing the bottom signal electrode;

a movable member including a top signal electrode disposed above the bottom signal electrode and disposed between two top actuation electrodes, and at least two support members that comprise the first dielectric layer and are each directly below a respective top actuation electrode;

wherein each of the top actuation electrodes is disposed above a respective bottom actuation electrode and a respective bump, and wherein each of the top actuation electrodes is electrically coupled to the respective bump by at least one via and one line through the first dielectric layer.

11. The MEMS switch of claim 10, wherein each of the bumps is disposed between a bottom signal electrode and a bottom actuation electrode.

12. The MEMS switch of claim 10, wherein each of the bumps is comprised of a metal.

13. The MEMS switch of claim 10, wherein each of the bumps is comprised of a dielectric layer disposed above a metal layer.

14. The MEMS switch of claim 10, wherein a top actuation electrode is drawn toward a respective bottom actuation electrode and the top signal electrode is drawn toward the bottom signal electrode upon application of a control voltage to a bottom actuation electrode, allowing a signal to propagate between the top and bottom signal electrodes.

15. The MEMS switch of claim 10, further comprising a metal contact disposed above the second dielectric layer, disposed below the top signal electrode, and electrically coupled to the bottom signal electrode.

16. The MEMS switch of claim 10, wherein the at least two support members contact an end of the two top actuation electrodes.

17. The MEMS switch of claim 10, wherein the at least one via is formed through at least one of the support members.

18. A micro-electro-mechanical systems (MEMS) switch, comprising:

a substrate;

a first dielectric layer above the substrate;

a bottom signal electrode, a bump, and a bottom actuation electrode above the first dielectric layer;

a second dielectric layer enclosing the bottom signal electrode;

a movable member including a top signal electrode disposed above the bottom signal electrode and a top actuation electrode disposed above the bottom actuation electrode and the bump;

a conductive component for electrically coupling the top actuation electrode to the bump; and at least one support member that comprises the first dielectric layer and is directly below the top actuation electrode.

19. The MEMS switch of claim 18, wherein the at least one support member contacts an end of the top actuation electrode.

20. The MEMS switch of claim 18, wherein the top actuation electrode is electrically coupled to the bump by at least one via through the at least one support member.

* * * * *